US009391989B2

(12) United States Patent
Consul et al.

(10) Patent No.: US 9,391,989 B2
(45) Date of Patent: Jul. 12, 2016

(54) AUTOMATIC IDENTIFICATION OF RETURNED MERCHANDISE IN A DATA CENTER

(71) Applicant: MICROSOFT TECHNOLOGY LICENSING, LLC, Redmond, WA (US)

(72) Inventors: Ashish Consul, Redmond, WA (US); Asad Yaqoob, Redmond, WA (US); Chandan Aggarwal, Seattle, WA (US); Muhammad Mannan Saleem, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 256 days.

(21) Appl. No.: 14/056,818

(22) Filed: Oct. 17, 2013

(65) Prior Publication Data

US 2015/0113106 A1 Apr. 23, 2015

(51) Int. Cl.
*H04L 29/06* (2006.01)
*H04L 12/751* (2013.01)
*H04L 29/12* (2006.01)
*H04L 12/24* (2006.01)
*G06F 21/44* (2013.01)
(Continued)

(52) U.S. Cl.
CPC ............ *H04L 63/0876* (2013.01); *G06F 21/44* (2013.01); *G06F 21/73* (2013.01); *G06F 21/81* (2013.01); *H04L 29/12113* (2013.01); *H04L 41/32* (2013.01); *H04L 45/02* (2013.01); *H04L 61/1541* (2013.01)

(58) Field of Classification Search
CPC ..... H04L 41/0806; H04L 29/06; H04L 41/32; H04L 63/0876; H04L 29/12113; H04L 45/02; H04L 61/1541; H04W 84/12; H04W 24/00; H04W 4/001; H04W 4/005; H04M 15/00
See application file for complete search history.

(56) References Cited

U.S. PATENT DOCUMENTS

| 6,950,946 B1* | 9/2005 | Droz | G06F 21/88 340/5.74 |
| 6,968,414 B2* | 11/2005 | Abbondanzio | G06F 13/409 710/104 |

(Continued)

OTHER PUBLICATIONS

Second Written Opinion Issued in PCT Application No. PCT/US2014/059794, mailed: Aug. 27, 2015, 6 Pages.

(Continued)

*Primary Examiner* — Chirag R Patel
(74) *Attorney, Agent, or Firm* — Ben Tabor; Kate Drakos; Micky Minhas

(57) ABSTRACT

A method and system for determining a device identifier assigned to a device within an installation of devices connected via a network is provided. A system determines the device identifier of a device that has been repaired and reinstalled so that the device can be placed in service. Upon receiving an indication that a repaired device has been reinstalled, the system requests and receives a possible device identifier of the repaired device from an interconnect device that connects the repaired device to the network. To verify that the possible device identifier is the actual device identifier, the system directs the repaired device to reboot so that it broadcasts its device identifier. When the repaired device reboots, it broadcasts its device identifier. Upon receiving the broadcast device identifier, the system verifies that the possible device identifier is the same as the broadcast device identifier.

20 Claims, 5 Drawing Sheets

(51) Int. Cl.
  *G06F 21/73* (2013.01)
  *G06F 21/81* (2013.01)

(56) References Cited

U.S. PATENT DOCUMENTS

| | | | | |
|---|---|---|---|---|
| 7,240,364 | B1* | 7/2007 | Branscomb | H04L 29/12113 726/5 |
| 7,590,653 | B2 | 9/2009 | Sparks | |
| 2004/0095897 | A1* | 5/2004 | Vafaei | H04L 29/06 370/254 |
| 2004/0103014 | A1 | 5/2004 | Teegan et al. | |
| 2007/0168691 | A1 | 7/2007 | Srivastava et al. | |
| 2009/0215449 | A1* | 8/2009 | Avner | H04W 8/06 455/433 |
| 2009/0276620 | A1* | 11/2009 | McCarron | H04L 9/3271 713/155 |
| 2009/0327799 | A1 | 12/2009 | Yazawa et al. | |
| 2011/0302290 | A1 | 12/2011 | Westerfeld et al. | |
| 2013/0124908 | A1 | 5/2013 | Gowin et al. | |
| 2013/0346736 | A1* | 12/2013 | Cook | G06F 9/4416 713/2 |
| 2014/0101467 | A1* | 4/2014 | Jubran | H04L 41/0856 713/310 |

OTHER PUBLICATIONS

Fultz, Joseph, "Branch-Node Synchronization with SQL Azure", Published on: Jan. 2011, Available at: http://msdn.microsoft.com/en-us/magazine/gg535668.aspx.

"Adaptive Server® Enterprise", Published on: Aug. 2005, Available at: http://infocenter.sybase.com/help/topic/com.sybase.help.ase_15.0.rl15ug/rl15ug.pdf.

Katz-Bassett, et al., "Lifeguard: Practical Repair of Persistent Route Failures", In ACM SIGCOMM Computer Communication Review, Aug. 13, 2012, 12 pages.

International Search Report and Written Opinion dated Jan. 29, 2015 for PCT/US2014/059794 filed Oct. 9, 2014.

International Preliminary Report on Patentability Issued in PCT Application No. PCT/US2014/059794, Mailed Date: Jan. 22, 2016, 7 Pages.

* cited by examiner

AUTOMATIC IDENTIFICATION OF RETURNED MERCHANDISE IN A DATA CENTER

BACKGROUND

Very large data centers have been, and will continue to be, built to support a variety of applications such as Internet searching, social networking, and cloud computing. These very large data centers may include tens of thousands of devices such as computer devices, storage devices, switches, routers, management devices, and so on. Because the devices can be expensive, a data center operator typically sizes the data center to have only enough devices to meet the anticipated demand. If a data center operator overestimates the demand, then these expensive devices will remain idle. Conversely, if a data center operator underestimates the demand, then business and consequently revenue may be lost because devices will not be available to meet the demand.

To maximize revenue and minimize expenses, a data center operator, in addition to trying to accurately size the data center, would like as many of the devices as possible at any given time to be in service, that is, available to service the applications of the data center. Unfortunately, with a very large data center, a large number of devices may be out of service at any given time for a variety of reasons. For example, some devices may be out of service because of software upgrades (e.g., new operating system) for those devices. Other devices may be out of service because of hardware problems (e.g., defective graphics processing unit or defective memory).

A data center operator may size the data center anticipating that a certain percentage of the devices will be out of service at any given time. For example, if a data center has 100,000 devices with a failure rate of 10% per year, then 10,000 devices on average would need to be repaired (including repair by replacement) each year. The data center operator would need to factor in the average time to repair a device when sizing the data center. Unfortunately, the time from when a failure is identified and the device goes out of service until the device is back in service can be many days. The process of repairing such a device may involve the requesting and receiving of a returned merchandise authorization, the removing of the failed device from the configuration data of the data center, the preparation of a repair order, the dispatching of a technician, the uninstalling of the device, the diagnosis of the problem, the repair work, the installing of the repaired device, and the adding of the repaired device to the configuration data of the data center. The adding of the repaired device to the configuration of the data center can be especially time-consuming and error-prone. It can be time-consuming because the repair technician needs to manually convey information to a manager of the data center who is responsible for manually updating the configuration information. Because of work backlogs of the technicians and the managers, it can take several days from the completion of the repair until the repaired device is back in service. It can be error-prone because the device identifiers (e.g., 16 hexadecimal digits in length) need to be manually transcribed and entered.

SUMMARY

A method and system for determining a device identifier assigned to a device within an installation of devices connected via a network is provided. In some embodiments, a system determines the device identifier of a device that has been repaired and reinstalled so that the device can be placed in service. Upon receiving an indication that a repaired device has been reinstalled, the system requests and receives a possible device identifier of the repaired device from an interconnect device that connects the repaired device to the network. The system then performs a verification to ensure that the possible device identifier is the actual device identifier of the target device. To perform the verification, the system directs the repaired device to reboot. When the repaired device reboots, it broadcasts its device identifier. Upon receiving the broadcast device identifier, the system determines whether the possible device identifier is the same as the broadcast device identifier. If they are the same, then the actual device identifier has been determined and the repaired device can now be placed in service.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

A method and system for determining a device identifier assigned to a device within an installation of devices is provided. In some embodiments, a repaired device identification ("RDI") system determines the device identifier of a device that has been repaired and reinstalled. After the device identifier is determined for a repaired device that has been reinstalled, the repaired device can then be placed in service and its resources are available to be allocated. The installation of devices (e.g., data center or server farm) may be organized into collections (e.g., server racks) of housings (e.g., blade slots) for devices (e.g., server blades). Each collection may have a collection identifier, and each housing may have a housing identifier. Upon receiving an indication that a target device (e.g., a repaired device) has been installed in a target housing of a target collection identified by a target housing identifier, the RDI system requests and receives from the target collection a possible device identifier of the target device. When the target device is installed in the target housing of the target collection, the target device registers its device identifier with the target collection. The RDI system then performs a verification to ensure that the possible device identifier is the actual device identifier of the target device. To perform the verification, the RDI system directs the target device to reboot. When the target device reboots, it broadcasts its device identifier. Upon receiving the broadcast device identifier, the RDI system determines whether the possible device identifier is the same as the broadcast device identifier.

If they are the same, then the target device identifier has been identified, and the target device can now be placed in service.

Figure 1:
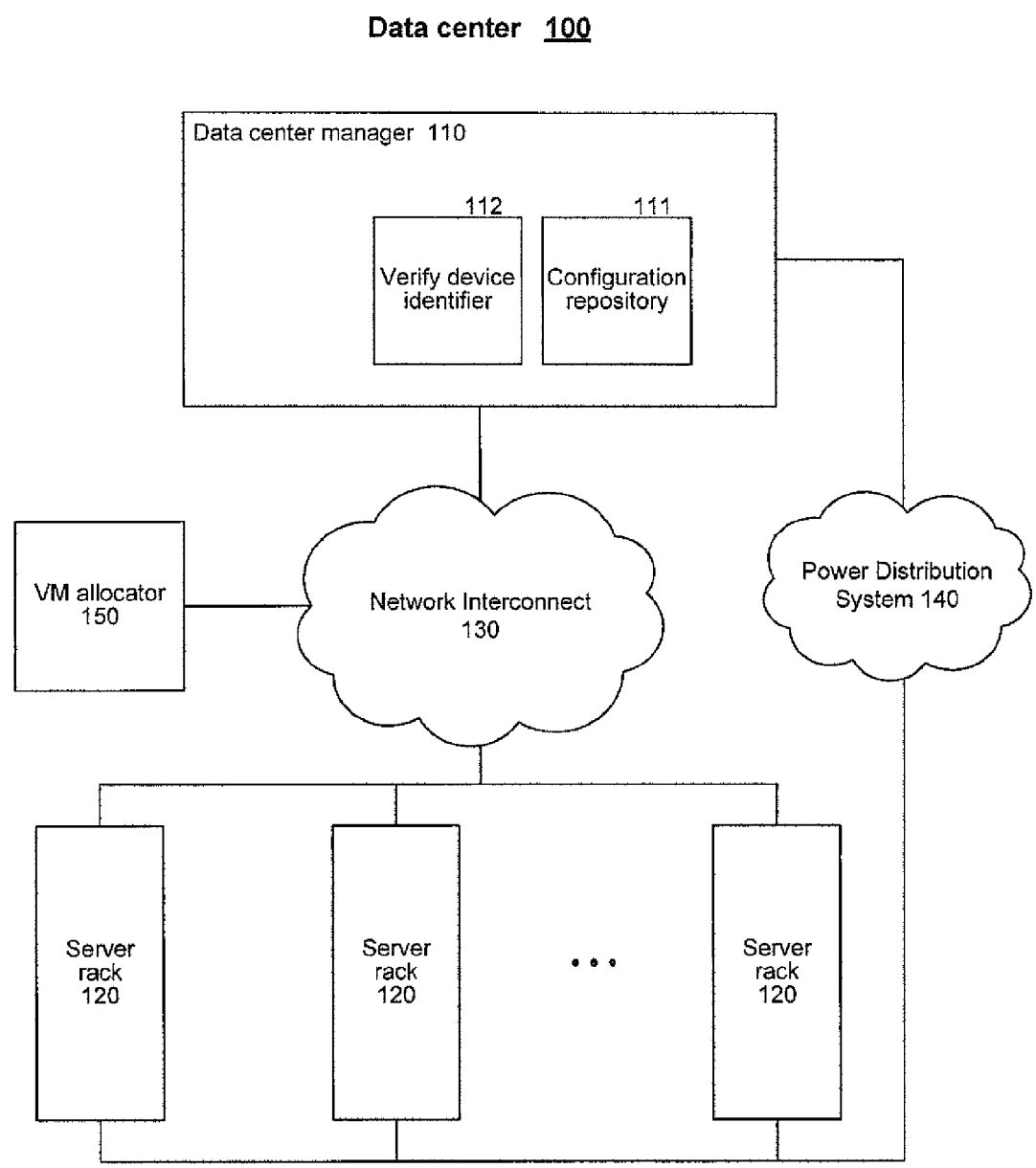
FIG. 1 is a block diagram that illustrates the organization of a very large data center in some embodiments.

In some embodiments, the RDI system may deployed in an installation that is a very large data center that provides a cloud computing platform for deploying and managing applications. The devices of the data center may be server blades that are housed in blade slots (i.e., housings) of server racks (i.e., collections). Each server rack may include an interconnect device (e.g., switch) for connecting the server blades installed in the blade slots of the server rack to a network. FIG. 1 is a block diagram that illustrates the organization of a very large data center in some embodiments. A data center 100 includes a data center manager 110, server racks 120, a network interconnect 130, a power distribution system 140, and a virtual machine ("VM") allocator 150. The data center manager provides the overall management functions of the data center. These management functions may include maintaining a configuration repository 111, identifying malfunctioning devices, controlling the upgrading of software, determining the device identifier of repaired devices, controlling the distribution of power, and so on. The data center manager includes a verify device identifier component 112 of the RDI system that verifies the device identifier when a repaired device has been reinstalled. The power distribution system provides power to each of the server racks and may selectively control power to individual blade slots. The VM allocator allocates virtual machines executing on the server blades to various applications deployed to the data center. The VM allocator interacts with the data center manager and the configuration repository to identify server blades that are in service.

Figure 2:
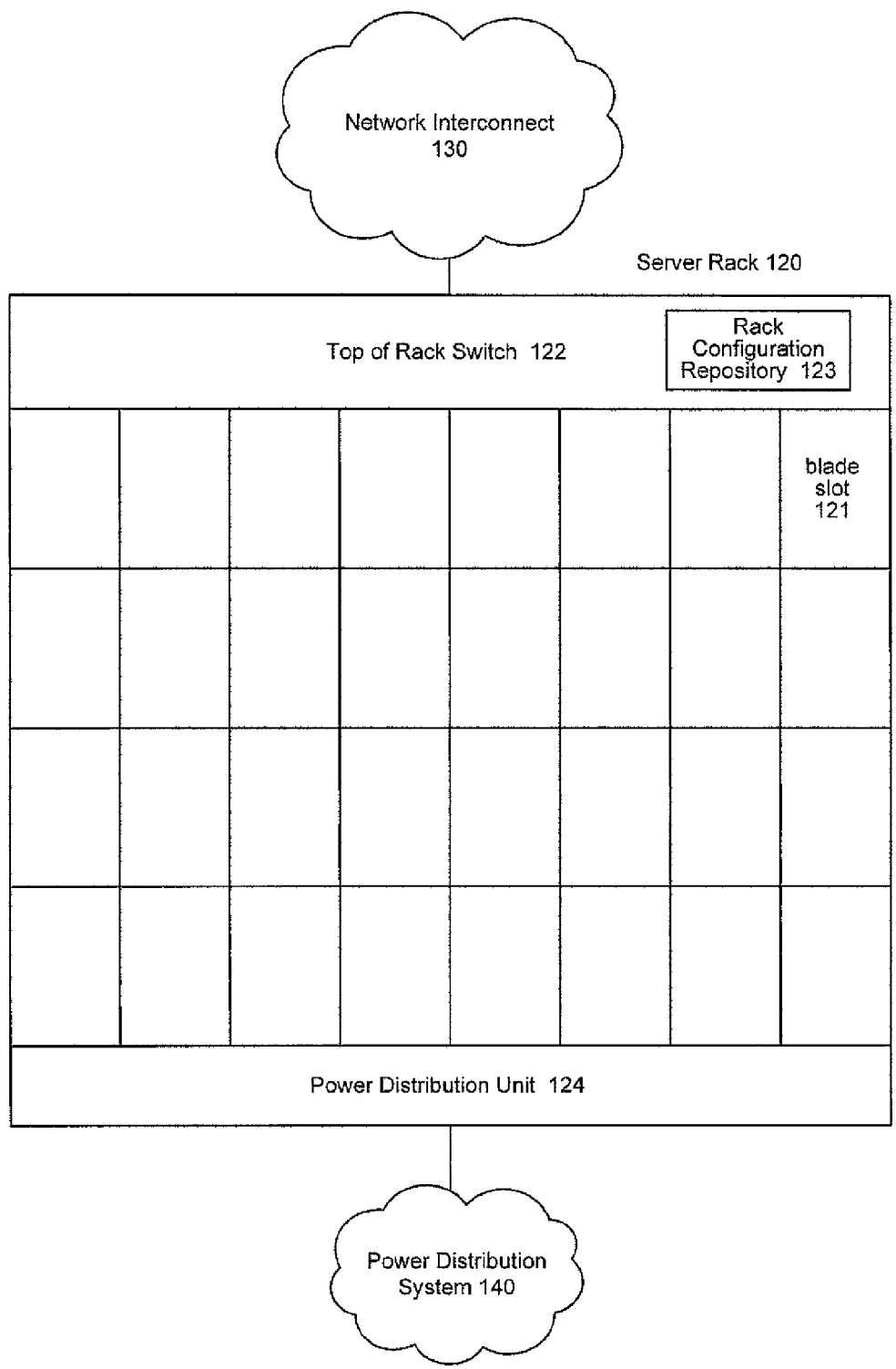
FIG. 2 is a block diagram that illustrates a server rack in some embodiments.

FIG. 2 is a block diagram that illustrates a server rack in some embodiments. The server rack 120 includes blade slots 121, a top of rack ("TOR") switch 122, and a power distribution unit 124. A server rack may have any number of blade slots (e.g., 32, 64, and 128) that each can house a server blade. Each server rack has a server rack identifier, and each blade slot within a server rack has a blade slot identifier. The TOR switch, which is an interconnect device, provides the server blades with access to the network interconnect 130. The TOR switch may maintain a rack configuration repository 123 that maps the blade slot identifiers to the server blade identifiers of the server blades installed in each blade slot. Some TOR switches support the publishing of the mappings of blade slot identifiers to server blade identifiers. Some TOR switches, however, may publish the mappings in a way that do not uniquely identify the mapping of each blade slot to a server blade. For example, some TOR switches publish mappings that map a blade slot identifier to all the server blade identifiers of server blades that have been installed in that blade slot. The power distribution unit connects to the power distribution system 140 so that the power distribution system can selectively control power to blade slots. When the power distribution system performs a power up cycle (e.g., power down followed by power up) for a blade slot, the server blade installed in the blade slot performs its power up boot processing. As part of the boot processing, the server blade may broadcast its media access control ("MAC") address in accordance with the Preboot Execution Environment protocol. The data center may use MAC addresses as the server blade identifiers.

Figure 3:
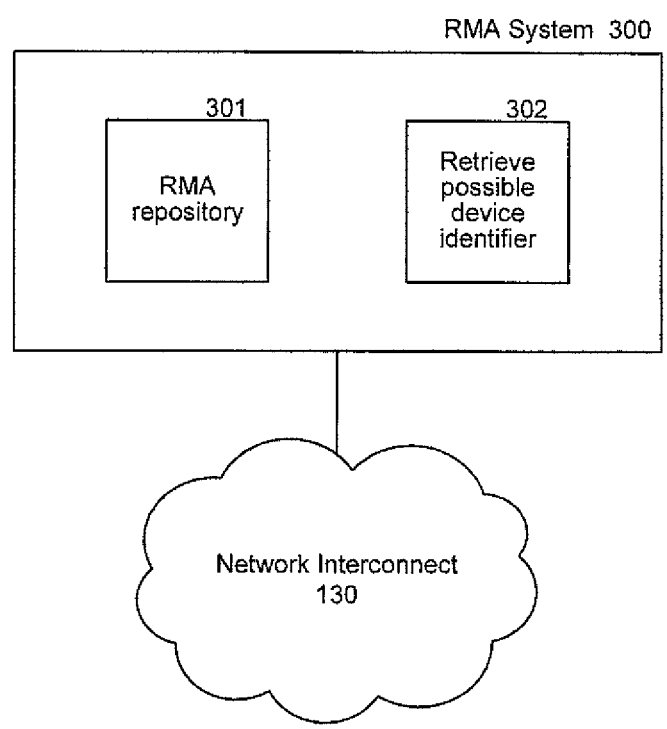
FIG. 3 is a block diagram that illustrates components of a returned merchandise authorization system in some embodiments.

FIG. 3 is a block diagram that illustrates components of a returned merchandise authorization system in some embodiments. The returned merchandise authorization ("RMA") system 300 allows for the tracking of server blades during the repair process. The RMA system may be connected to the network interconnect 130. The RMA system includes an RMA repository 301 that contains an entry for a returned merchandise authorization for repairing a server blade. The RMA system allows for the updating of the entry to reflect the current status for the returned merchandise authorization. When the repair is complete and a server blade has been reinstalled in the blade slot of the server blade that was out of service, the entry is updated to record the MAC address of the server blade, which may be the same MAC address if the same server blade is reinstalled or may be a different MAC address if a different server blade is installed or the same server blade but with a new network interface controller ("NIC") is reinstalled. The RMA system also includes a retrieve possible device identifier component 302, which is part of the RDI system. The retrieve possible device identifier component is invoked when a repair is complete to retrieve the MAC address from the TOR switch and provide that MAC address to the data center manager for verification and for placing the device in service.

In some embodiments, to determine the server blade identifier of a server blade installed in a blade slot, the RDI system acquires the mappings of blade slot identifiers to server blade identifiers and verifies that one of the mapped-to server blade identifiers is the same as that broadcast by the server blade when booting. Upon receiving notification that a target server blade installed in a target blade slot of a target server rack has been repaired, the RDI system sends to the TOR switch of the target server rack a request for the MAC address of the target server blade of the target blade slot. The RDI system also requests the power management system to cause the target server blade to reboot. After receiving one or more possible MAC addresses from the TOR switch and receiving the MAC address broadcast while booting, the RDI system determines whether the broadcast MAC address is the same as any of the possible MAC addresses. If so, the RDI system designates the broadcast MAC address as that of the target server blade currently installed in the target blade slot by, for example, updating the configuration repository of the data center manager so that the target server blade is placed in service.

In some embodiments, the RDI system may also determine the configuration of a repaired server blade and update the configuration repository accordingly. The configuration of a repaired server blade may be different from that of the server blade prior to being repaired. For example, the repaired blade server may actually be a different blade server that includes a different amount of memory, a different graphics processing unit, a different amount of disk storage, a different number of cores, a different version of an operating system or other software, and so on. Even if the repaired blade server is the same blade server that was previously installed in that blade slot, its hardware and/or software configuration may have changed as part of the repair process. Upon determining the MAC address of a repaired server blade, the RDI system uses the MAC address to determine the configuration of the repaired server blade and updates the configuration repository. In this way, the configuration repository can be automatically updated with the current configuration of repaired server blades.

The computing devices on which the RDI system may be implemented may include a central processing unit, input devices, output devices (e.g., display devices and speakers), storage devices (e.g., memory and disk drives), network interfaces, graphics processing units, and so on. The input devices may include keyboards, pointing devices, touch screens, gesture recognition devices (e.g., for air gestures), head and eye tracking devices, microphones for voice recognition, and so on. The computing devices may access computer-readable mediums that include computer-readable storage mediums and data transmission mediums. The computer-readable storage mediums are tangible storage means that do not include a transitory, propagating signal. Examples of computer-readable storage mediums include memory such as primary memory, cache memory, and secondary memory (e.g., DVD) and include other storage means. The computer-readable storage mediums may have recorded upon or may be encoded with computer-executable instructions or logic that implements the prioritization system. The data transmission medium is media for transmitting data using transitory, propagating signals or carrier waves (e.g., electromagnetism) via a wire or wireless connection.

The RDI system may be described in the general context of computer-executable instructions, such as program modules and components, executed by one or more computers, processors, or other devices. Generally, program modules or components include routines, programs, objects, data structures, and so on, that perform particular tasks or implement particular data types. Typically, the functionality of the program modules may be combined or distributed as desired in various embodiments. For example, the components of the RDI system may be implemented on a data center manager 110, on a RMA system 300, distributed between the data center manager and the RMA system, or some other system. Aspects of the RDI system may be implemented in hardware using, for example, an application-specific integrated circuit ("ASIC").

Figure 4:
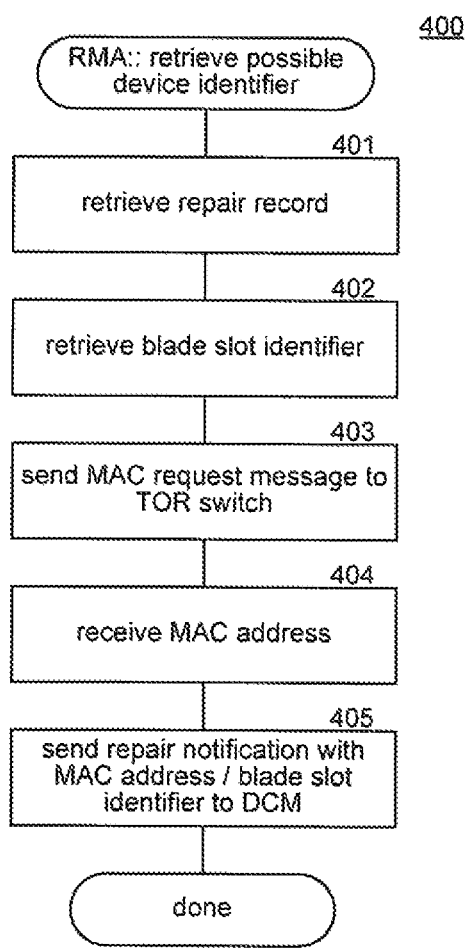
FIG. 4 is a flow diagram that illustrates the processing of a retrieve possible device identifier component of the RDI system in some embodiments.

FIG. 4 is a flow diagram that illustrates the processing of a retrieve possible device identifier component of the RDI system in some embodiments. A retrieve possible device identifier component 400 may be implemented on the RMA system and invoked whenever the repair of a device has been completed. The component retrieves a possible device identifier, such as a MAC address, from the TOR switch and provides that possible MAC address in a repair notification that is sent to the data center manager. In block 401, the component retrieves the entry containing the repair record for the repaired device from the RMA repository. In block 402, the component retrieves from the repair record the housing identifier of the housing into which the repaired device has been reinstalled. In block 403, the component sends a MAC request message to the TOR switch. In block 404, the component receives a possible MAC address from the TOR switch. In block 405, the component sends a repair notification to the data center manager that includes the possible MAC address and the housing identifier of the housing that contains the repaired device. The component then completes. In some embodiments, the repair record may also include a MAC address for the repaired device. In such a case, the component may compare that MAC address to the received MAC address to ensure that they are the same before sending a repair notification to the data center manager.

Figure 5:
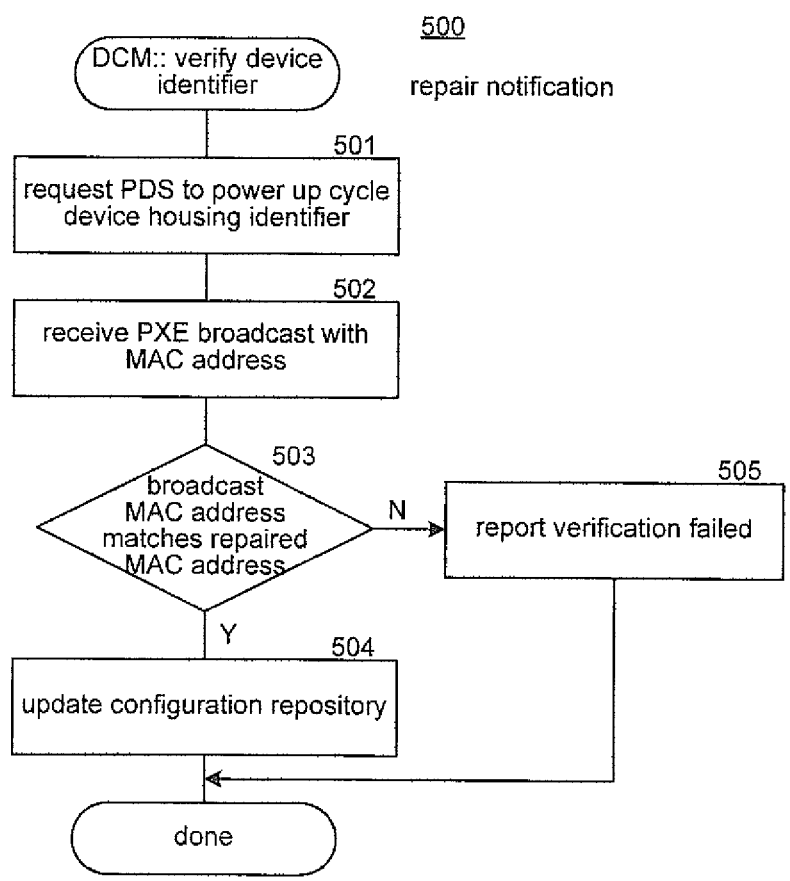
FIG. 5 is a flow diagram that illustrates the processing of a verify device identifier component of the RDI system in some embodiments.

FIG. 5 is a flow diagram that illustrates the processing of a verify device identifier component of the RDI system in some embodiments. A verify device identifier component 500 is passed a repair notification that includes a possible MAC address and a housing identifier and verifies that the possible MAC address is the same as that broadcast by the repaired device. In block 501, the component requests the power distribution system to perform a power up cycle for the housing identified by the housing identifier. The power distribution system may cut off power to the housing momentarily so that the device installed in the housing reboots when the power is restored. As part of the rebooting process, the device broadcasts its MAC address in accordance with the Preboot Execution Environment protocol. In block 502, the component receives the broadcast MAC address. In decision block 503, if the broadcast MAC address is the same as the possible MAC address included in the repair notification, then the MAC address is verified and the component continues at block 504, else the component continues at block 505. In block 504, the component updates the configuration repository to effect the placing of the device in service and the completes. In block 505, the component reports that the MAC address of the device could not be verified and then completes. In some embodiments, the repair notification may include a list of possible MAC addresses. In such a case, the component designates a MAC address as verified when the broadcast MAC address matches at least one of the MAC addresses in the list.

Although the subject matter has been described in language specific to structural features and/or acts, it is to be understood that the subject matter defined in the appended claims is not necessarily limited to the specific features or acts described above. Rather, the specific features and acts described above are disclosed as example forms that implement the claims. For example, rather than using a power distribution system to reboot a server blade so that its MAC address is broadcast, a server rack may have a hardware or software mechanism to direct a server blade to broadcast its MAC address without rebooting. Accordingly, the invention is not limited except as by the appended claims.

We claim:

1. A method for determining a device identifier assigned to a device within an installation, the installation having collections of devices, each collection having multiple housings for housing devices, each housing having a housing identifier, the method comprising:
    receiving an indication that a target device has been installed in a target housing of a target collection identified by a target housing identifier; and
    after receiving the indication that a target device has been installed,
        receiving a possible device identifier of the target device;
        directing a power management system to control power to the target housing to effect a reboot of the target device; and
        after directing the power management system,
            receiving a broadcast device identifier broadcast by the target device as a result of rebooting;
            comparing the received broadcast device identifier to the received possible device identifier; and
            when the received broadcast device identifier and the received possible device identifier are the same, designating that same device identifier as the device identifier of the target device.

2. The method of claim 1 wherein the installation has a network interconnect and each collection has an interconnect device for providing access to the network interconnect to the devices installed in the housings of the collection.

3. The method of claim 2 wherein the interconnect device maintains a mapping of housing identifiers to device identifiers.

4. The method of claim 3 wherein the possible device identifier is received from the interconnect device of the target collection.

5. The method of claim 1 including when multiple possible device identifiers are received from the target collection and when the broadcast device identifier is the same as one of the multiple possible device identifiers, designating the broadcast device identifier as the device identifier of the target device.

6. The method of claim 1 wherein the possible device identifier is received after sending a request to the target collection for a device identifier of the target device installed in the target housing.

7. The method of claim 1 wherein the device identifier is a media access control ("MAC") address.

8. The method of claim 7 wherein the target device broadcasts its MAC address based on a Preboot Execution Environment protocol.

9. The method of claim 1 wherein the device is a server blade, the collection is a blade rack, and the housing is a blade slot.

10. One or more computer-readable storage mediums storing computer-executable instructions for controlling a computer to determine a device identifier assigned to a device within an installation after a change to a device, the installation having collections of devices, each collection having a collection identifier and multiple housings for housing devices, each housing having a housing identifier, the computer-executable instructions comprising instructions that:
    receive a change record indicating a target device currently installed in a target housing of a target collection identified by a target housing identifier was installed as a result of a change relating to a device previously installed in the target housing;
    send to the target collection a request for a device identifier of the target device installed in the target housing;
    in response to the request, receive from the target collection a possible device identifier of the target device;
    direct a power management system to control power to the target housing to effect a power up cycle by the target device;
    receive a broadcast of a broadcast device identifier, the broadcast being sent as a result of a power up cycle of a device; and
    when the broadcast device identifier and the possible device identifier are the same, designate the broadcast device identifier as the device identifier of the target device.

11. The one or more computer-readable storage mediums of claim 10 wherein each collection includes an interconnect device for providing access to the network to the devices of the collection.

12. The one or more computer-readable storage mediums of claim 11 wherein the interconnect device maintains a mapping of housing identifiers to device identifiers.

13. The one or more computer-readable storage mediums of claim 10 wherein, when multiple possible device identifiers are received from the target collection and when the broadcast device identifier is the same as one of the multiple possible device identifiers, the instructions further designate the broadcast device identifier as the device identifier of the target device.

14. The one or more computer-readable storage mediums of claim 10 wherein the device identifier is a media access control ("MAC") address.

15. The one or more computer-readable storage mediums of claim 14 wherein the target device broadcasts its MAC address based on a Preboot Execution Environment protocol.

16. The one or more computer-readable storage mediums of claim 10 wherein a device is a server blade, the collection is a blade rack, and the housing is a blade slot.

17. A computing system for determining a media access control ("MAC") address assigned to a server blade within a server farm, the server farm having server racks, each server rack having a server rack identifier and multiple blade slots, each blade slot for housing a server blade, each server rack having an interconnect device for providing access to a network to the server blades, each blade slot having a blade slot identifier, the computing system comprising:
    one or more processors for executing computer-executable instructions comprising instructions that:
        receive an indication that a repair associated with a target blade slot of a target server rack has been completed, the target blade slot identified by a target blade slot identifier;
        after receiving the indication of the repair,
            send to a target interconnect device of the target server rack a request for a MAC address of a target server blade associated with the target blade slot;
            receive from the target interconnect device one or more possible MAC addresses;
            direct a power management system to control power to the target blade slot identified by the target blade slot identifier to effect a power up cycle by the target server blade; and
        after directing the power management system,
            receive a broadcast of a broadcast MAC address as a result of a power up cycle of the target server blade; and
            when the broadcast MAC address is the same as one of the possible MAC addresses, update a repository to indicate that the target server blade installed in the target blade slot has that broadcast MAC address.

18. The computing system of claim 17 wherein the interconnect device of a server rack maintains a mapping of blade slot identifiers to MAC addresses.

19. The computing system of claim 17 wherein the target server blade broadcasts its MAC address based on a Preboot Execution Environment protocol as a result of a power up cycle.

20. The computing system of claim 17 wherein the instructions further include instructions that, after receiving the broadcast MAC address, collect configuration information from the target server blade and update a configuration repository that is used when allocating resources of the server farm.

* * * * *